United States Patent [19]

Le Carpentier

[11] Patent Number: 4,752,950
[45] Date of Patent: Jun. 21, 1988

[54] REMOTE CONTROL SYSTEM FOR FRANKING MACHINES

[75] Inventor: Marc Le Carpentier, Antony, France

[73] Assignee: SMH Alcatel, Paris, France

[21] Appl. No.: 880,847

[22] Filed: Jul. 1, 1986

[30] Foreign Application Priority Data

Jul. 2, 1985 [FR] France .................. 85 10081

[51] Int. Cl.⁴ .......................................... H04M 11/00
[52] U.S. Cl. ..................................... 379/106; 379/93; 379/102; 364/464
[58] Field of Search ................... 379/92, 93, 94, 97, 379/98, 106, 107, 102, 104; 364/464, 466, 200 MS File, 900 MS File

[56] References Cited

U.S. PATENT DOCUMENTS

| | | | |
|---|---|---|---|
| 3,596,256 | 7/1971 | Alpert et al. | 364/200 |
| 3,868,640 | 2/1975 | Binnie et al. | 379/92 |
| 4,097,923 | 6/1978 | Eckert, Jr. et al. | 364/900 |
| 4,122,532 | 10/1978 | Dlugos et al. | 364/900 |
| 4,138,735 | 2/1979 | Allocca et al. | 364/900 |
| 4,301,507 | 11/1981 | Soderberg et al. | 364/464 |
| 4,308,579 | 12/1981 | Dlugos | 364/200 |
| 4,365,293 | 12/1982 | Holtz | 364/200 |
| 4,394,540 | 7/1983 | Willis et al. | 379/107 X |
| 4,422,148 | 12/1983 | Soderberg et al. | 364/464 |
| 4,455,453 | 6/1984 | Parasekvakos et al. | 379/107 X |
| 4,528,785 | 6/1985 | Soderberg et al. | 364/464 |

FOREIGN PATENT DOCUMENTS

| | | |
|---|---|---|
| 2528647 | 12/1983 | France . |
| 947991 | 1/1964 | United Kingdom . |
| 2032224 | 4/1980 | United Kingdom . |

Primary Examiner—Keith E. George
Attorney, Agent, or Firm—Sughrue, Mion, Zinn, Macpeak & Seas

[57] ABSTRACT

A remote control system for a set of machines (1) for franking mail, which machines are geographically dispersed in accordance with user requirements and include franking heads whose use is monitored by a distant central organization. Each franking head is connected to a local concentrator station (4) via a data transmission link (11), and each local station is in turn connected via a telephone channel (3) to a central remote monitoring station (2) belonging the central organization. Each local station monitors the machines connected thereto and collects operating information supplied by their heads, and it interchanges data with the central station in differed time.

9 Claims, 3 Drawing Sheets

REMOTE CONTROL SYSTEM FOR FRANKING MACHINES

BACKGROUND OF THE INVENTION

The present invention relates to a remote control system for a set of franking machines.

In conventional manner, franking machines are designed to enable large users to print stamps on postal items to be posted corresponding to the fees which the sender needs to pay to ensure that said postal items arrive at their destinations without any additional fees being due. Such franking machines totalize the franked values responding to the stamps printed and use thereof is thus very closely monitored, since the high throughput of which these machines are capable could lead to very large financial losses for the organization which collects the postage fees, in the event of the machines being used improperly.

Two parallel methods are used to do this, one being based on pre-payment of the values to be franked, and the other on post-payment. Conventionally, in the first case, franking machines cease to operate when the total of franked values reaches the pre-paid value, thereby requiring users to regularly "re-fill" their machines in order to prevent them from going out of service. In one known embodiment, transportable meters act as monitoring instruments and the user must remove these meters from the machines and convey them to the postal Administration for re-filling, and this gives rise to numerous well-known inconveniences both for the users and for the Administration.

In the second case, the user provides regular detailed statements of the franking performed by each machine, and these statements must immediately be transmitted to the postal Administration under pain of inconvenient sanctions and on-site inspection of the meter units of the machines which may be performed at any moment by employees of said postal Administration.

This method has the particular drawback of requiring both the user and the postal Administration to perform a considerable amount of bookkeeping and checking work in respect of the statements, and in practice complicated and highly time-consuming procedures have to be used.

Both of the above methods outlined above are thus capable of being improved to the advantage both of the postal Administration and of users by replacing inconvenient and time-consuming procedures which require human intervention by procedures which are automated and less inconvenient.

SUMMARY OF THE INVENTION

To this end, the present invention proposes a remote control system for a set of franking machines which are geographically dispersed to meet the needs of users and which include franking heads whose use is monitored by a remote central organization.

According to a characteristic of the invention, each franking head is connected to a local concentrator station via a data transmission link, and each local station is itself connected via a telephone channel to a central remote meter-reading station of the central organization, which local stations both monitor the franking machines and collect operating data read from the franking heads by means of bases, and also communicate said operating data to the central station after grouping the data and calling said central station via a telephone channel, in accordance with instructions previously supplied by said central station.

DESCRIPTION OF THE PREFERRED EMBODIMENTS

Figure 1:
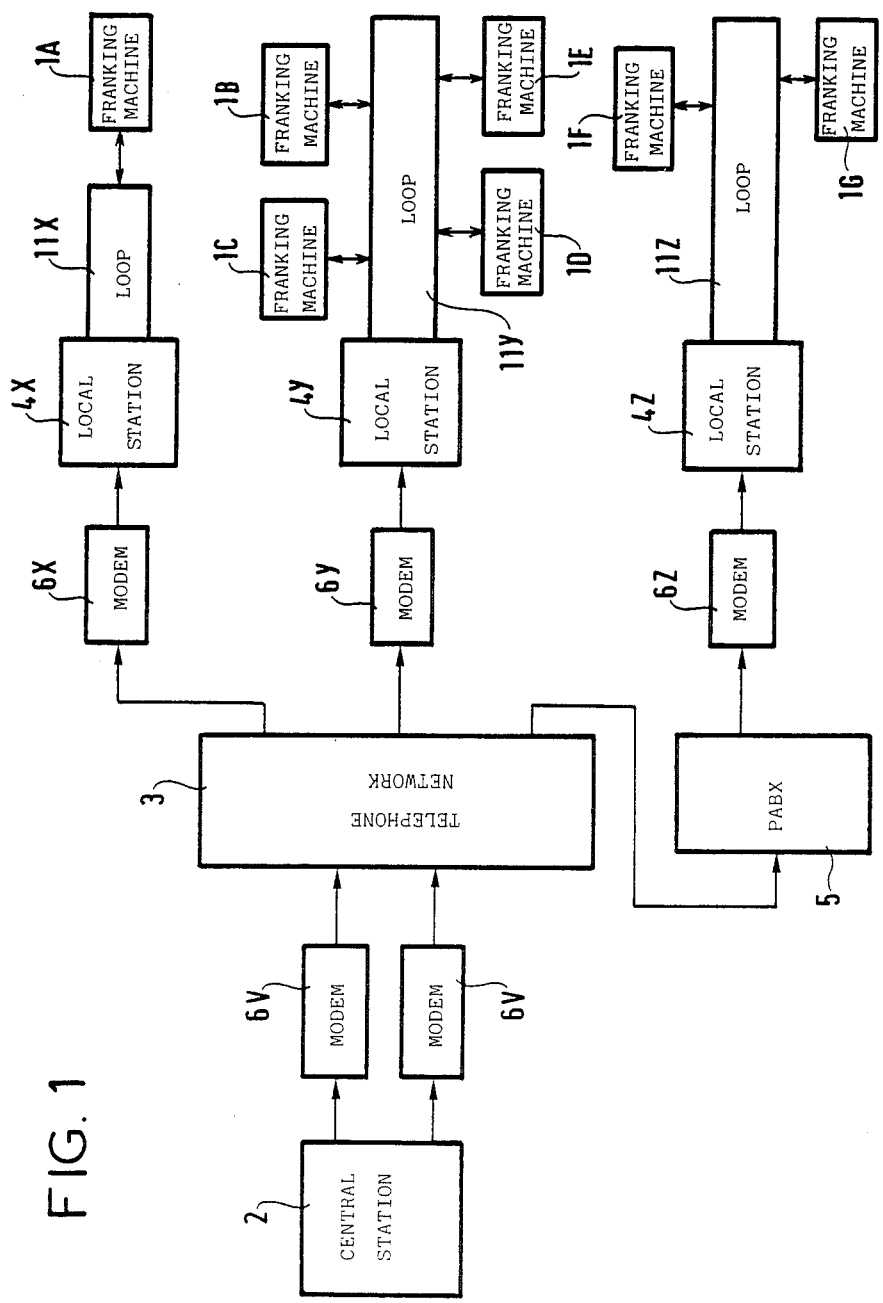
FIG. 1 is a block diagram of a remote control system in accordance with the invention.

The system shown in FIG. 1 is intended for remotely controlling a plurality of franking machines 1A to 1G from a central station 2 (generally belonging to the postal Administration), via a telephone network 3 (generally the public network) which is used for transmitting the data that needs to be exchanged between the central station and the franking machines.

To this end, the franking machines 1 which are geographically dispersed in accordance with user needs, are connected to intermediate concentration stations 4 depending on their location and optionally on their numbers, said concentration stations being referred to as "local" stations and each being used to provide a connection between the central station 2 and one or more franking machines 1 via the telephone network 3.

In a preferred embodiment, the remote control system and more particularly the local stations 4 are designed to adapt to various kinds of telephone connection. In particular, a single franking machine such as 1A or a plurality of franking machines such as 1B, 1C, 1D, and 1E may be directly connected to the public telephone network via a common local station such as 4X in one case or 4Y in the other; otherwise, it is possible to provide a connection via a private exchange such as 5 enabling data to be exchanged between a local station such as 4Z serving one or more franking machines and the central station 2 via the telephone network 3.

In one embodiment, relating more particularly to a system of the remote meter-reading type, the central station 2 serves as a concentrator for an entire set of franking machines which are symbolized in this case by the machines referenced 1A to 1G. This central station stores and processes all of the management data relating to operation of the franking machines in order to bill the franking performed and without processing the franking per se in this case.

Various franking machines 1 are monitored from the local station 4 to which they are connected by a link 11, and this is shown in the present case as being in the form of a loop such as loops 11X, 11Y, and 11Z.

Each franking machine 1 uses meters for metering various data items relating the franking it performs to continuously totalize these operations, independently from the local station 4 to which it is connected. Each local station 4 permanently interrogates the franking machines connected thereto in order to update an image of the meters in the machines, regardless of the status thereof, so as to ready at any moment to supply the central station 2 with up-to-date information.

Insofar as data is exchanged between a local station 4 and the central station 2 over the switched network, communication equipments 6 must be provided to enable the telephone calls to be set up automatically and to exchange data. In addition, means are also provided for encrypting the transmitted data in order to avoid the system being exploited or disturbed by unauthorized third parties.

Figure 2:
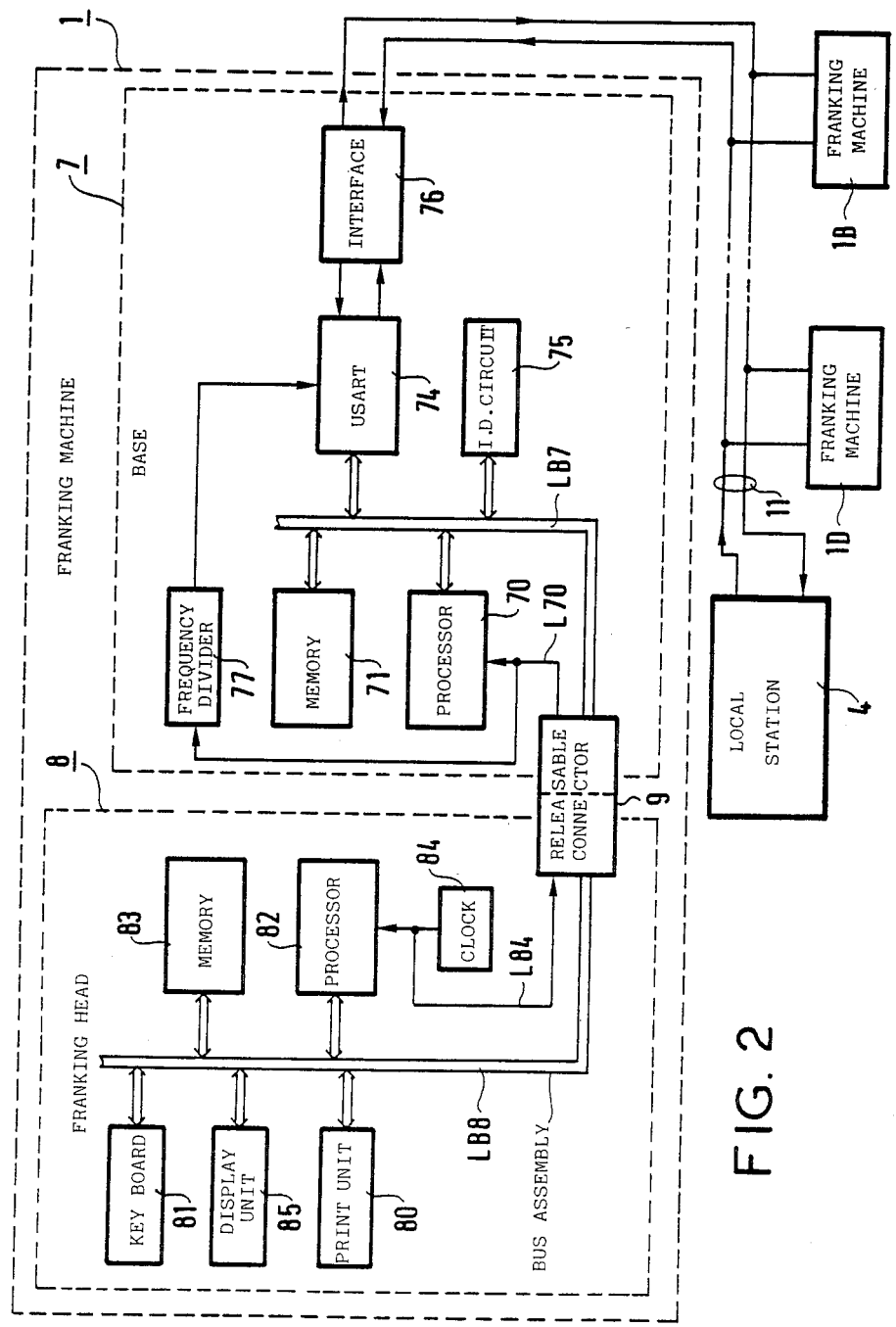
FIG. 2 is a block diagram of a remote controlled franking machine for a system in accordance with the invention, said machine being connected in a loop with other identical machines to a local station.
Figure 3:
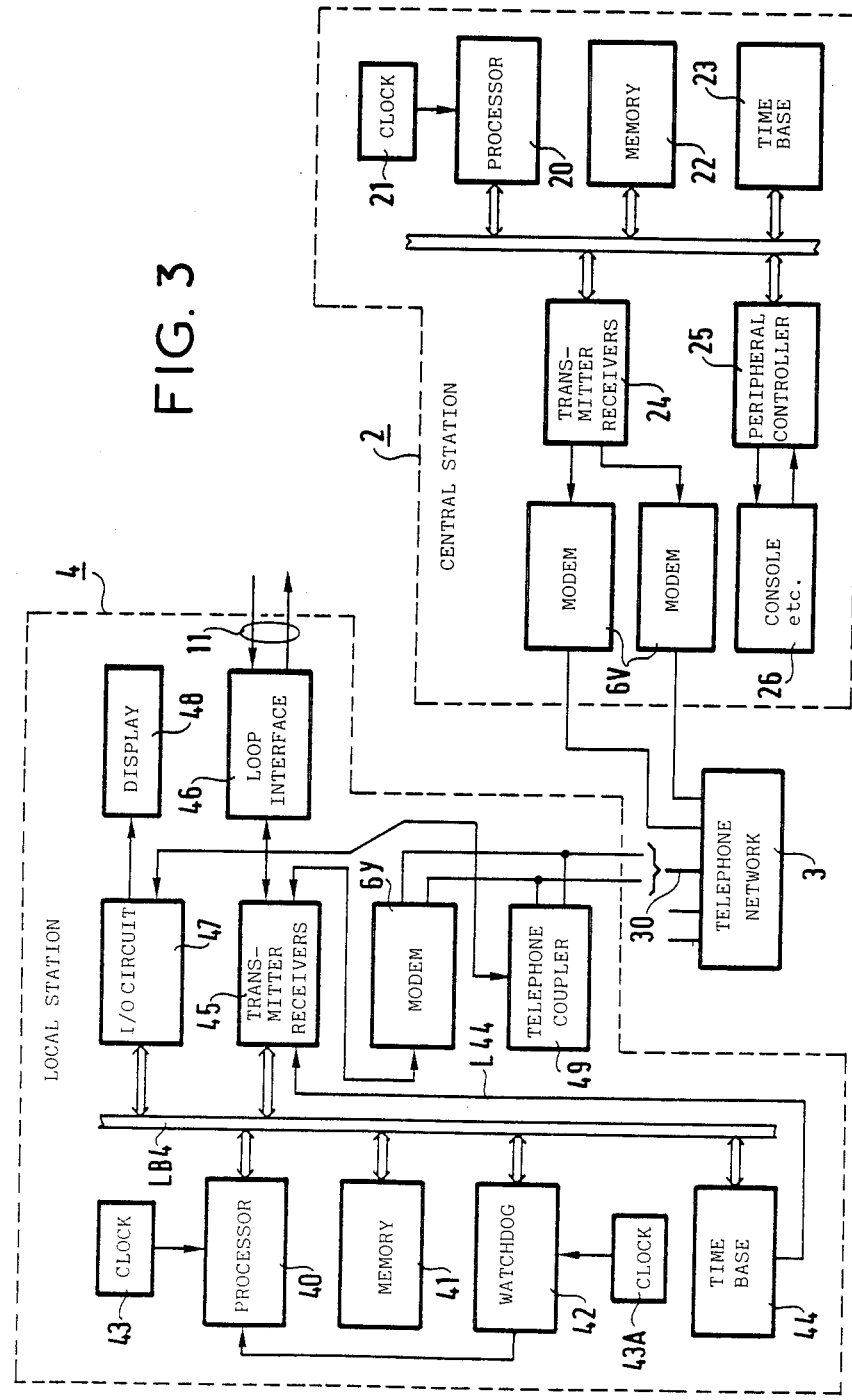
FIG. 3 is a block diagram of a local station and a central station for a system in accordance with the invention.

FIG. 2 shows the construction of a remote-controlled franking machine 1 in accordance with the invention in greater detail. The machine described comprises a base 7 associated with a franking head 8, where it should naturally be understood that in some embodiments the base may be omitted given that the franking head may include the non-redundant items provided, in the present example, in the base. The franking head 8 shown here comprises a print unit or head 80 for use on demand to stamp mail to be posted. Such printer units are quite conventional and serve, in particular, to print the date and place of posting of the mail together with the franked amount; such printer means are conventionally controlled by the user via a keyboard connected to control logic, and these items are only briefly summarized herein given that their structure is well-known.

As mentioned above, the franking head 8 associates a keyboard 81 with the print unit 80 which it includes together with control logic conventionally organized around a processor 82 associated with memory 83 and driven by an oscillator 84 which is conventionally a crystal oscillator.

A display unit 85 provides the user with a certain amount of useful information, in particular the results of operations performed by the user or a selection of possible subsequent operations in a process under way.

A bus assembly LB8 interconnects the keyboard, the print unit, the processor, and its memories, and also the display unit; and said bus assembly may comprise, for example, a control bus, an address bus, and a data bus, with said buses being connected according to requirements and with the entire bus assembly LB8 also having access to the base 7 via a releasable connector arrangement 9.

In conventional manner, the memory 83 is subdivided into read only memory and read/write memory for permanently or temporarily storing programs and data used by said programs or generated by said programs. In particular, the contents of the meters required for managing the franking head and the data enabling the head to be identified are saved in the memory and this data is intended for forwarding to the central station of the system via the base 7 and the local station connected thereto.

The base 7 is preferably provided to serve a single franking head 8, but it may include various subsidiary equipments, for example scales for weighing letters or packets, i.e. equipments which are conventionally associated with a franking head without being incorporated therein. Such accessory equipments are not shown here, given that they are not directly concerned with the invention.

The base 7 necessarily includes an assembly for storing and exchanging data, constituted by a "machine" interface and serving to provide communication between the franking head which it serves and a local station to which it is connected, and regardless of the selected head.

This machine interface comprises a processor 70 associated with memory 71 and served together with its memory by a bus assembly LB7 which is suitable for connecting to the bus assembly LB8 of a franking head 8 via the releasable connector arrangement 9. The connector arrangement 9 also supplies the clock input of the processor 70 from the oscillator 84 of the franking head via links L84-L70 connected end-to-end, thereby synchronizing the processor 70 on the processor 82 to which it is slaved.

The bus assembly LB7 also serves a synchronous or asynchronous transmitter/receiver circuit 74, which circuit may be a conventional USART, and is intended to transfer data between the franking head and a local station via the base 7. An identification circuit 75 is also connected to the bus assembly 72 and serves to individualize the base by means of a special identification number enabling it to be recognized by the local station to which it is connected when said local station serves a plurality of bases 7 and consequently a plurality of franking machines.

The USART circuit 74 is associated with a matching interface circuit 76 for connection to a local station, preferably via a loop which is intended to connect a plurality of franking machines to a common station as shown by the loop connections 11Y and 11Z in FIG. 1. The USART circuit 74 takes its send frequency from the oscillator 84 via a frequency divider 77.

The machine interface is provided to allow the local station to find out at any moment the status of the franking head to which the interface is connected and to act on said franking head whenever necessary. In order to do this, the machine interface interrogates the franking machine 8 which it serves by successive interrupt requests, in order to be able to respond immediately to requests from the local station on the basis of the information which it has collected.

In particular, the base 7 copies as often as possible into the memory 71 those data items which are required for remote meter reading and which are contained in a backed-up read/write portion of the memory 83 in the franking head. Each copy preferably takes place during a single machine cycle in order to avoid taking account of values in the middle of changing. For example, each copy may take account of the contents of a franking index register suitable for determining the franking value of a given cycle, the contents of the cycle register from which the number of cycles performed at a given value can be deduced, and the contents of a fault register concerning the franking head, with said registers being intergrated in the memory 83.

In a preferred embodiment, the franking head also communicates its identification number when the machine is switched on (where any franking head changing operation requires the machine to be initially switched off).

The base 7 is initialized on receiving a special signal from the franking head which it serves, with bases being inactive if not connected to a head.

Data exchange between a franking head and a base takes place via the integrated data bus constituted by the interconnected bus assemblies LB8 and LB7. Such data exchange takes place in response to control signals transmitted over special wires of the control bus included in said bus assemblies.

The processors 70 and 82 are respectively a slave and a master processor, with the processor 70 being capable of responding solely to requests from its master which may occur at any moment. These two processors may be conventional 8-bit processors which are identical or compatible.

The USART circuit 74 acts as a transmitter/receiver between the base 7 in which it is contained and which processes data in parallel form and the local station to which it is connected via a two-way link 11 which accepts data in serial form only.

Data is transmitted by the base 7 over the link 11 in response to a request from the local station which is provided, for this purpose, with addressing means which act on the identification circuit 75 of said base in order to set off the transmission process.

In one embodiment, each base 7 has an individual identification number and a tranmission process via its USART circuit 74 is triggered only when said number is received from the local station by its identification circuit 75.

A message sent from a base to a local station in response to a request therefrom may comprise, for example, a sequence of binary data items organized as 8-bit bytes and including:

a byte defining an encrypting mask, i.e. the value to be applied by a receiver to decrypt the message containing said byte;

a byte specifying the number of the transmitting station and an order code;

a status byte relating to the states of the base and the head during transmission;

one or more head identification bytes;

bytes corresponding to the contents of the index, value, and fault registers; and a message check byte defining longitudinal parity of the message as sent in order to enable proper reception to be verified.

The messages and the various checks necessary to their transmission are built up by the processor 70 in conventional manner and this is not described further herein.

The sending of messages by the USART circuit 74 takes place in serial asynchronous form on the outgoing line of the link 11 via the interface 76 as mentioned above. Transmission is set in motion by the processor 70 after receiving a message from the local station which contains the identification number of the base including this USART circuit.

The clock controlling data transmission from the base is obtained by dividing the clock signal provided by the oscillator 84, and the same procedure is used for receiving data from the local station. The signal frequency used for reception is considerably higher than that of the transmission clock in order to enable proper sampling to take place. For example, the transmission frequencies may be about 12 kHz both from the base and from the local station, whereas the reception sampling frequency may be sixteen times higher.

The interface 76 is essentially intended to match signals output from the USART circuit 74 towards the local station to the characteristics of the line used and to the selected interchange protocol, for example in accordance with the RS422 standard, which is a conventional loop interface.

Various modes of coupling the bases 7 under the control of a local station with said local station may be devised, in addition to a differential RS422 type link as mentioned above, and it would naturally be possible to provide a direct link for a base situated close to the local station, a current loop type of link, an optical link via an optical fiber, etc. . . .

The structure of the interface 76 is thus liable to vary widely depending on the selected mode of coupling.

As mentioned above, the local station 4Y is intended to control one or more franking machines which are connected thereto by means of a loop link 11.

The local station 4Y is organized around a processor 40 for managing interchanges both with the franking machines and also with a distant central station 2, to which the local station is suitable for connection via a telephone network 3 having at least one telephone line 30 to which it has access.

The processor 40 may be a conventional eight-bit microprocessor, for example, and it is conventionally associated with an oscillator 43 and a set of memories 41 including, in particular, read/write memory for saving essential data in the event of a power cut in the electricity supply to the local station. When such saving takes place, the microprocessor is temporarily halted at the end of the current work cycle and for the duration of the power outage.

A watchdog device 42 is also associated with the processor 40 in such a manner as to verify that the processor is operating properly since, in practice, the local station is transparent for the user who need not be concerned with how it is operating and it is therefore necessary for the local station to do its own checking.

To this end, the watchdog device 42 receives clock signals from a monitoring oscillator which is based on an RC-type circuit in this case in order to provide independent cyclic time measurement. The software loaded in the processor 40 is designed to pass cyclically through a determined stage which re-occurs at intervals of time which are less than the period of time fixed by the watchdog device 42, and the watchdog applies an interrupt to the processor 40 if the processor 40 has not passed through the determined stage when the watchdog has reached the end of its count.

Any overflow gives rise to a fault being marked suitable for being communicated to the central station 2, and optionally gives rise to the processor preparing data for diagnostic purposes.

The memories 41 in the local stations 4 are checked regularly so long as there are no more urgent tasks to be performed. Checks are performed by means of longitudinal parity test means which compare the longitudinal parity calculated over the program memory with a previously stored value, which value may be the result of a calculation performed when the system was generated.

Write test means check the data memory and serve to write the inverse of a memory cell's contents into each memory cell while interrupts are masked, and then verifies that such writing has taken place prior to returning the cell concerned to its initial state.

A time base 44 is also associated with the processor 40 in order to provide both recurring interrupts enabling real time operations to be performed, and also generating the transmission frequencies necessary for data interchanges with the franking machines and with the central station.

These data interchanges take place over a set of asynchronous transmitter/receivers 45 constituted in this case by two units respectively provided for communications with the franking machines 1 via the loop link L1 and with the central station 2 via the telephone network.

In one embodiment, this set of transmitter/receivers 45 is provided by means of a single circuit including two independent transmitter/receivers which individually send and receive clock signals provided by the time base 44 via a link L44.

One of the independent transmitter/receivers is connected by a loop interface 46 to the loop L1 serving the franking machines associated with the local station in which said transmission receiver is included.

This loop interface 46 provides the necessary modifications for applying the selected communications protocol (in this case in accordance with the RS422 standard) and these known modifications are not described in greater detail herein.

The second independent transmitter is connected to the modem 6Y and is provided with the necessary control and data transmission links for this purpose.

An input/output (I/O) circuit 47 is also connected to the bus assembly LB4 which serves the processor 40, its memories 41, the watchdog circuit 42, the time base 44, and the set of transmitter/receivers 45. This I/O circuit 47 has two two-way lines, and is connected to a display unit 48 and to a telephone coupler 49.

One of these two lines is essentially for input purposes and receives signals from the telephone coupler 49 representative of telephone signalling frequencies whenever these are detected. The second line is essentially for output purposes and delivers display commands to the display unit 48 and dialling commands to the telephone coupler 49 in order it to cause it to dial the central station 2. It also controls a loop-back for auto-testing the modem 6Y.

The display unit 48 displays, for example, indications of faults detected by the software, and in particular faults observed when checking the memories.

The telephone coupler 49 is connected to the telephone network 3 via a line 30 to which it is connected in parallel with the modem 6Y, in order to put the modem 6Y into communication with one of the modems 6V of the central station via the telephone network.

To this end, the telephone coupler 49 includes means for looping the telephone line 30 in order to obtain dial tone from the telephone network 3. The telephone coupler 49 also includes means for recognizing the various public or private signalling tones liable to be received during a call in order to enable the processor to take the necessary steps, and in particular to connect the modem 6Y to the telephone line on receiving a "ready" tone transmitted by the central station in response to a call. The telephone coupler 49 also includes means for generating dialling signals in order to dial the telephone number of the central station over the telephone line 30, for example by means of loop-disconnect pulses. The central station 2 is connected to the telephone network by at least one and preferably by two telephone lines to which it is connected by means of respective modems 6V which are compatible with the modems 6Y of the local stations which it supervises.

The central station 2 is organized around a processor 20 conventionally clocked by an oscillator 21 which also provides the clock signals necessary for transmission purposes.

A set memories 22 is also associated with the processor 20 for storing the operating system program which at least preprocesses the data supplied by the local stations 4 and temporarily stores the data supplied by said stations or for supplying to said stations.

A time base 23 periodically applies at least one interrupt to the processor 20 in order to cause it to perform periodic tasks and to update a calendar enabling the monitored events to be dated.

A set of synchronized emitter/receivers 24, comprising three transmitter/receivers, for example, provides simultaneous dialog with two local stations 4 and with at least one unit in a conventional set of computer peripherals 26, for example a keyboard and screen terminal or console for interchanging information with a human operator.

A bus assembly LB2 conventionally interconnects the processor 20, its memories 22, its time base 23, the set of transmitter/receivers 24, and a conventional set of peripheral controllers 25 serving the peripherals in the set of peripherals 26.

In accordance with the invention, although communications with the central station 22 are set up at the request of the local stations 4, it is the central station 2 which takes charge once a call is established, and it is also the central station which initializes the local stations by downloading and which fixes the period and the frequency of duties for each local station.

The processor 20 of the central station detects when a local station fails to call the central station and informs operators via the set of peripherals 26 in order to allow the operators to take the necessary steps.

If a franking machine is not interrogated by the local station which supervises it, the machine is prevented from operating and thus gives rise to a user reaction.

Data interchanges between the central station and a local station and between a local station and the franking machines are monitored by timeout means both in the slave equipment and in the master equipment. Each transmitting master equipment beginning a transmission starts a timeout to cover the transmission time and the maximum of time during which a reply may be expected. If the timeout times out before a reply is received, the message is repeated at least once.

Each slave equipment also starts a timeout on receiving the first character of a message and this timeout is shorter than the master equipment timeout in order to allow the receiver means of the slave equipment to be re-initialized if its timeout times out before the number of received characters has been counted down to zero, given that the starting number is predetermined.

In the embodiment described, a dialog between two equipments is performed in asynchronous mode and provides for each character to be transmitted in the form of eleven binary digits (bits) comprising eight bits representative of the character in coded form, one parity bit, and a start bit and a stop bit which bracket the nine other bits.

Each message begins with a byte corresponding to an encrypting mask whose purpose is to prevent an unauthorized third party from writing and/or reading a message, and this applies to data interchanges both between franking machines and a local station, and between a local station and the central station.

To this end, two equipment in communication are provided with a common secret private key CP and a common key table TC where access values are stored in a random order.

A random counter CX is used by the processor of the transmitting equipment to perform the function $M = f(CX, CP)$, and the counter CX is also used to point to an access key CA in the key table TC, thereby enabling the processor to perform a function $K = f(CA(CX), data)$ on the data to be transmitted.

The pointer is incremented for each data character in a given message and thus supplies a different value CA for the next character. Consequently, two identical characters in the same message are differently encrypted, as are two identical messages.

A message is sent in the following order:

M, K(CX0), K(CX1), ... K(CXn)

The receiver finds the value of CX by performing the function CX=f(M. CP) and the values of the data characters by performing the function data=f(K, CA(CX)).

Each local station thus has two different pairs, each constituted by a key table TC and a private key CP: one pair is for data interchanges between the local station and a franking machine; and the other pair is for data interchanges between the local station and the central station.

If ever a data interchange fails to be completed in accordance with the established protocol between a master equipment and a slave equipment, the master equipment is arranged to take the necessary precautionary measures, and when this concerns data interchanges between a local station and a franking machine, the result is a blocked franking machine.

When a machine is initialized or when modifications are to be sent to the franking heads, the central station is arranged to perform downloading by transmitting data to the local station concerned during a call initiated by said local station, where said call may, optionally, be made at the request of the central station.

The local station then informs the, or each, franking machine concerned at the specified instant, which may be deferred in time.

The central station responds to the data provided by the franking machines to the local stations and by the local stations to the central station, for example, by drawing up a partial journal indicating, in particular, for each customer the type of surveillance performed as a function of its frequency, the number of franking machines concerned, the number of telephone calls set up by the local station concerned, the cumulative values and daily values from the franking counters, and the cycle counters, with optional carrying forward from the preceding journals, together with the daily franking totals and faults as detected.

What is claimed is:

1. A remote control system for a set of franking machines (1) which are geographically dispersed in accordance with user requirements and which comprise franking heads (8) whose use is under the control of a remote central organization, said system being characterized in that each franking head (8) is connected to a concentrator local station (4) via a data transmission link, and each local station (4) is in turn connected via a telephone switching network to a remote controlling central station (2) belonging to the central organization, said local stations serving firstly to monitor the franking machines and collect operating information taken from the franking heads via bases, secondly to communicate said operating information to the central station via a link through said telephone switching network initiated by said local station station in accordance with instructions previously provided thereto by said central station via said telephone switching network, and thirdly to receive control information from said central station via a link through said telephone switching network.

2. A remote control system according to claim 1, characterized in that each franking head (8) is mounted on a respective base (7) and is connected to a concentrator local station (4) via a data transmission link connecting said local station to the base on which the franking head is mounted and with which it is connected.

3. A remote control system according to claim 2, wherein each franking heads includes a control logic circuit comprising a processor (82) associated with memories (83) via a first interchange bus assembly (LB8), characterized in that each base (7) includes an assembly for storing and exchanging data intended for connecting the franking head carried by said base with the local station to which said base is connected by a data transmission link (11), said assembly for storing and exchanging data serving firstly to provide synchronous transmission between a processor (20) and memories (22) which it includes and the processor and the memories of said head carried by said base via a second interchange bus assembly (LB7) connected to the first exchange bus assembly (LB8) of the base via a common connector (9), and secondly to provide transmission in synchronous form or asynchronous form with the local station concerned via a synchronous or asynchronous transmitter/receiver circuit (74) inserted between the second interchange bus assembly (LB7) and an access interface (76) and connected to the data transmission link (11) serving said concerned local station.

4. A remote control system according to claim 3, characterized in that a processor (70) is provided for managing information interchanges between a local station (4) to which a base containing said processor (70) is connected and an associated franking head (8), said base for managing information exchanges being slaved to the processor (82) of said control logic circuit of said franking head and being synchronous therewith, and said franking head comprising an oscillator (84) clocking both said processor for managing information exchanges and said processor of said control logic circuit.

5. A remote control system according to claim 2, characterized in that each local station (4) comprises firstly a synchronous or asynchronous transmitter/receiver unit (45) connected via an access interface (46) to a data transmission link serving a base to which said local station is connected, and secondly a telephone coupler (49) and a modem (6Y) connected in parallel to a common telephone line (30) giving access to a telephone network (3) giving access to the central station (2), together with a control logic circuit (40 to 44, LB4) for managing and temporarily storing said data interchanges.

6. A control system according to claim 5, characterized in that the modem (6Y) and the telephone coupler (49) of a local station are respectively connected to a bus assembly (LB4) of the control logic circuit of said local station, respectively via a synchronous or asynchronous data transmitter/receiver unit (45) and by an input/output unit (47) for signals for telephone signalling.

7. A control system according to claim 6, characterized in that the central station (2) includes modems (6V) compatible with the modems in the local stations for interchanging data via a telephone network, and a processor (20) acting as a master relative to the processors (40) of the local stations connected to said central station from the moment when said local stations have established a telephone link with said central station.

8. A remote control system for a set of franking machines (1) which are geographically dispersed in accordance with user requirements and which comprise franking heads (8) whose use is under the control of a remote central organization, each franking machine including a base (7) on which a respective franking head (8) is mounted, said system being characterized in that:

each franking head (8) is connected to a concentrator local station (4) via a data transmission link connecting the local station to the base on which the franking machine is mounted to permit data interchange between said local station and base, and each local station (4) is in turn connected via a telephone switching network to a remote controlling central station (2) belonging to the central organization to permit data interchange between said local station and said central station;

each local station (4) comprises firstly a synchronous or asynchronous transmitter/receiver unit (45) connected via an access interface (46) to said data transmission link serving a base to which said local station is connected, and secondly a telephone coupler (49) and a modem (6Y) connected in parallel to a common telephone line (30) giving access to said telephone switching network (3) giving access to said central station (2), together with a control logic circuit (40 to 44, LB4) for managing and temporarily storing said data interchanges;

said local stations serving firstly to monitor the franking machines and collect operating information taken from the franking heads via bases, secondly to communicate said operating information to the central station via a link through said telephone switching network initiated by said local station station in accordance with instructions previously provided thereto by said central station via said telephone switching network, and thirdly to receive control information containing said instructions from said central station via a link through said telephone switching network; and said system being further characterized in that at least one local station (4) is clocked by an oscillator (43) and includes a timing means (44) for real time operation, said at least one local station also including a watchdog device (42) driven by an independent oscillator (43A) and suitable for generating an interrupt for a processor (40) of the control logic circuit of said at least one local station in order to provide self-checking, and in that said processor (40) provides cyclic individual interrogation of each base under its surveillance in order to cause each corresponding franking machine to lock up if its base does not respond directly to being interrogated, said franking machine locking up on its own accord if it is erroneously interrogated or if it is not interrogated under predetermined conditions.

9. A remote control system for a set of franking machines (1) which are geographically dispersed in accordance with user requirements and which comprise franking heads (8) whose use is under the control of a remote central organization, each franking machine including a base (7) on which a respective franking head (8) is mounted, said system being characterized in that:

each franking head (8) is connected to a concentrator local station (4) via a data transmission link connecting the local station to the base on which the franking machine is mounted to permit data interchange between said local station and base, and each local station (4) is in turn connected via a telephone switching network to a remote controlling central station (2) belonging to the central organization to permit data interchange between said local station and said central station;

each local station (4) comprises firstly a synchronous or asynchronous transmitter/receiver unit (45) connected via an access interface (46) to said data transmission link serving a base to which said local station is connected, and secondly a telephone coupler (49) and a modem (6Y) connected in parallel to a common telephone line (30) giving access to said telephone switching network (3) giving access to said central station (2), together with a control logic circuit (40 to 44, LB4) for managing and temporarily storing said data interchanges;

said local stations serving firstly to monitor the franking machines and collect operating information taken from the franking heads via bases, secondly to communicate said operating information to the central station via a link through said telephone switching network initiated by said local station station in accordance with instructions previously provided thereto by said central station via said telephone switching network, and thirdly to receive control information containing said instructions from said central station via a link through said telephone switching network; and wherein the control logic circuit of each local station includes a program memory portion and a data memory portion, said system further comprising a longitudinal parity test means for comparing a longitudinal parity calculated in said program memory portion during a test with its previously stored value, together with data memory write means for writing the inverse of the contents of each memory cell of said data memory portion into said cell, for verifying that said write operation has been performed, and then for returning the cell concerned to its initial state, said test means being regularly activated in the absence of other tasks to be performed.

* * * * *